United States Patent [19]

Masada

[11] Patent Number: 4,963,723
[45] Date of Patent: Oct. 16, 1990

[54] AUTOMATIC TOLL COLLECTOR FOR TOLL ROADS

[75] Inventor: Shigeo Masada, Itami, Japan
[73] Assignee: Mitsubishi Denki Kabushiki Kaisha, Japan
[21] Appl. No.: 269,721
[22] Filed: Nov. 10, 1988
[30] Foreign Application Priority Data
  Jun. 21, 1988 [JP] Japan ................. 63-151086
[51] Int. Cl.$^5$ ............. G06F 15/30; G06F 15/48
[52] U.S. Cl. ........................ 235/384; 235/380; 364/467
[58] Field of Search .............. 364/467, 464.01; 235/375, 376, 380, 381, 384, 492; 382/1; 902/6, 22; 340/928, 937; 194/901

[56] References Cited

U.S. PATENT DOCUMENTS

| | | | |
|---|---|---|---|
| 3,705,976 | 12/1972 | Platzman | 340/928 |
| 4,303,904 | 12/1981 | Chasek | 340/928 |
| 4,603,390 | 7/1986 | Mehdipour et al. | 902/6 |
| 4,652,729 | 3/1987 | Kubota et al. | 235/384 |
| 4,845,347 | 7/1989 | McCrindle et al. | 235/492 |

FOREIGN PATENT DOCUMENTS

| | | | |
|---|---|---|---|
| 58-139269 | 8/1983 | Japan | 235/384 |
| 58-222369 | 12/1983 | Japan | 235/384 |
| 59-66762 | 4/1984 | Japan | 235/384 |
| 60-215288 | 10/1985 | Japan | 235/384 |

OTHER PUBLICATIONS

Japan Transportation Management Technology Association, "Recognizing Wanted Vehicles at a Glance...", plus translation, no date known.
"Automatic Car-Number Telling System", by the Japan Traffic Control Technology Association.

Primary Examiner—Stuart S. Levy
Assistant Examiner—Robert A. Weinhardt
Attorney, Agent, or Firm—Leydig, Voit & Mayer

[57] ABSTRACT

An automatic toll collector has a portion installed at an entrance toll gate and a portion installed at an exit toll gate of a toll road. Each portion has a decoder which recognizes information on the license plate of a vehicle entering the toll gate, and a read and write mechanism which reads and writes into an IC card information necessary for the collection of tolls. The driver of the vehicle inserts the IC card into one of the read and write mechanisms at each toll gate and carries the IC card with him as he travels along the toll road. At the exit toll gate, a comparing and toll calculating mechanism calculates the toll based on the information stored on the IC card. A toll withdrawal mechanism at the exit gate automatically withdraws the toll from a bank account which is indicated by the information stored in the IC card.

11 Claims, 5 Drawing Sheets

AUTOMATIC TOLL COLLECTOR FOR TOLL ROADS

BACKGROUND OF THE INVENTION

This invention relates to an automatic toll collector for collecting tolls from a driver on a toll road by withdrawing the toll from the bank account of the driver.

On toll roads for vehicles on which the toll depends upon the distance traveled along the road, the collection of tolls requires a human attendant at each toll gate of the toll road. The conventional method of collecting tolls is as follows. When a vehicle is about to enter a toll road, the driver of the vehicle must stop at an entrance toll gate. There, the attendant of the toll gate inputs information concerning the vehicle, such as whether it is a small or large vehicle, into a keyboard, and based on the information which is input, an automatic ticket machine issues a ticket which the attendant hands to the driver. The ticket contains punched holes in which information such as the date, the toll gate number, and the type of vehicle is encoded. Upon receiving the ticket, the driver can enter the toll road with his vehicle.

When the driver wishes to exit from the toll road, he stops at an exit toll gate and hands the ticket to an attendant at the toll gate. The attendant inserts the ticket into a card reader which deciphers the information encoded in the punched holes of the ticket and calculates the toll. The attendant then manually collects the toll from the driver of the vehicle, after which the driver can exit from the toll road.

Since much of the process of collecting tolls in the above manner must be performed by human attendants, it is a slow process. When there are a large number of vehicles trying to enter or exit from a toll road, the time required to collect the toll for each vehicle leads to the formation of long lines and causes traffic backups on the toll road itself near the entrances and exits.

Furthermore, not only is it necessary to pay the toll gate attendants for their time spent collecting tolls, it is necessary to pay workers to collect the cash which was received as tolls from the toll gates at the end of the day, to count the cash, to check records, to perform other clerical duties, and to supervise operations, so that the collection of tolls entails significant labor costs.

In addition, at interchanges and rest stops along toll roads, drivers traveling in opposite directions sometimes exchange tickets with one another, whereby a driver can obtain a ticket issued at an entrance toll gate near to his destination and reduce the toll which he has to pay upon leaving the toll road. Although the exchange of tickets is illegal, using the conventional toll collecting method, it is impossible to detect such illegal practices and therefore they can not be prevented.

SUMMARY OF THE INVENTION

Accordingly, it is an object of the present invention to provide an automatic toll collector which can collect tolls from drivers on a toll road without using human attendants and without using cash.

It is another object of the present invention to provide an automatic toll collector which can collect tolls more quickly than is possible using human attendants, thereby reducing traffic backups on toll roads.

It is yet another object of the present invention to provide an automatic toll collector which can prevent drivers from performing illegal acts such as exchanging tickets with one another.

An automatic toll collector in accordance with the present invention collects a toll from a driver of a vehicle by automatically withdrawing the amount of the toll for a specified bank account and transferring the amount to the bank account of the operator of the toll road.

Instead of using tickets with punched holes, the toll collector calculates tolls based on information which is stored in a portable electronic storage medium which the driver of the vehicle carries with him as he travels along the toll road. At each toll gate, the driver of the vehicle inserts the storage medium into an information transfer mechanism which can read information from and write information into the storage medium. The information stored in the storage medium includes the account number of a bank account, and the toll is withdrawn from this bank account by a toll withdrawal mechanism.

An automatic toll collecting apparatus in accordance with the present invention comprises:

a first decoding means for recognizing the information contained in a distinctive marking on a vehicle entering an entrance toll gate of a toll road, the distinctive marking uniquely identifying the vehicle;

a portable storage medium which travels with the vehicle along the toll road and which stores information which identifies a bank account from which the toll is to be withdrawn and other information necessary for collecting tolls;

a first information transfer means for reading information which is stored in the portable storage medium and which writes into the portable storage medium information necessary for calculating tolls and information contained in the distinctive marking of said vehicle;

a second decoding means for recognizing the information contained in the distinctive marking of the vehicle when it enters an exit toll gate of the toll road;

a second information transfer means for reading the information stored in the portable storage medium and writing information into the portable storage medium;

a comparing and toll calculating means for selecting data from the data which was read by the second information transfer means corresponding to the vehicle entering the exit toll gate and for calculating the toll from the entrance toll gate to the exit toll gate based on the selected data; and a toll withdrawal means for automatically withdrawing the calculated toll from the bank account which is indicated by the storage medium.

The distinctive marking can be any marking which uniquely identifies the vehicle and provides any other information which is necessary for calculating the toll, such as the type of vehicle (commercial, light vehicle, passenger vehicle, etc.). In a preferred embodiment, the distinctive marking comprises the characters on the license plate of the vehicle.

The portable storage medium can be any storage medium which is capable of storing the data necessary for the collection of tolls. Furthermore, it must be possible to easily alter at least some of the contents of the storage medium. In a preferred embodiment, the portable storage medium is an IC card having an unalterable memory and an alterable memory.

BRIEF DESCRIPTION OF THE DRAWINGS

In the figures, the same reference numerals indicate the same or corresponding parts.

DESCRIPTION OF THE PREFERRED EMBODIMENTS

Figure 1:
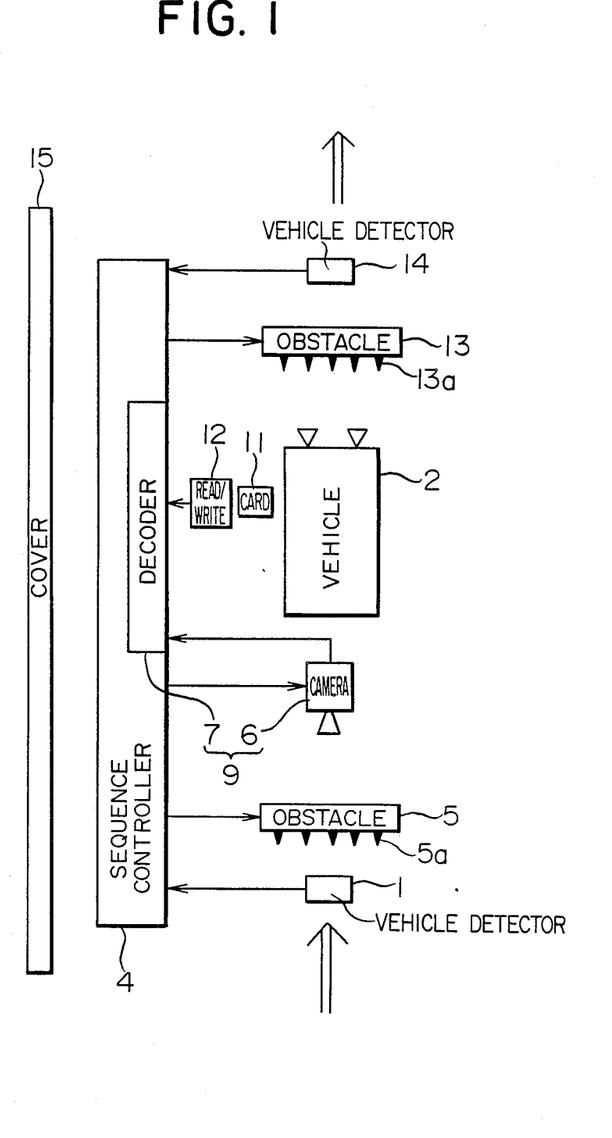
FIG. 1 is a schematic plan view of the portion of a first embodiment of a toll collector in accordance with the present invention which is installed at an entrance toll gate of a toll road.

Hereinbelow, a number of preferred embodiments of an automatic toll collector in accordance with the present invention will be described while referring to the accompanying drawings. A toll collector of the present invention is divided into a portion which is installed at an entrance toll gate of a toll road and another portion which is installed at an exit toll gate of a toll road. FIG. 1 is a schematic plan view of the portion of a first embodiment which is installed at an entrance toll gate. As shown in this figure, an entrance-side vehicle detector 1 which detects the entrance of a vehicle 2 into the toll gate is installed on a suitable location at the front end of the toll gate, such as atop a frame built over the road. (In the present explanation, "front" refers to the lower end of each figure, and "rear" refers to the upper end.) The entrance-side vehicle detector 1 can be any type of device which is capable of sensing the presence of a vehicle 2. In the present embodiment, it comprises a light-emitting element, a light-receiving element, and a photoelectric circuit. The light-emitting element shines light onto the surface of the road, and the light-receiving element receives light which is reflected back from the road surface to the detector 1. When a vehicle 2 enters the toll gate, it blocks the pathway of light and the amount of light which is received by the light-receiving element varies. The variation in the amount of light is sensed by the photoelectric circuit, and the photoelectric circuit sends an output signal indicating the presence of a vehicle 2 to a sequence controller 4.

A front obstacle 5 which prevents the vehicle 2 from entering the toll gate without first making a stop is disposed to the rear of the entrance-side vehicle detector 1. The front obstacle 5 can be any type of device which can block or permit the movement of a vehicle; in the present embodiment, the front obstacle 5 comprises a plurality of sharp spikes 5a which can be extended from or retracted into unillustrated slits which are formed in the road surface. Normally, the spikes 5a of the front obstacle 5 project from the road surface and prevent the passage of a vehicle 2, but when the entrance-side vehicle detector 1 senses the entrance of a vehicle 2 into the toll gate, the sequence controller 4 outputs an electrical signal to the front obstacle 5, and the spikes 5a are retracted into the slits, thereby allowing the vehicle 2 to move forwards.

To the rear of the front obstacle 5, an imaging apparatus in the form of a video camera 6 is installed on a suitable portion of the toll gate, such as atop the previously-mentioned frame, from where it can form an image of the front license plate of the vehicle 2. The camera 6 is electrically connected to a decoder 7 which includes an image processor 8. The decoder 7 analyzes the image of the license plate which is formed by the video camera 6 and obtains desired information from the image, such as the type of vehicle and the license plate number. The video camera 6 and the decoder 7 together constitute a first decoding means 9.

A first information transfer means in the form of a first read and write mechanism 12 which can read and write information into an IC card is disposed to the rear of the camera 6 and confronts the driver's side of the vehicle 2. The first read and write mechanism 12 performs reading and writing with respect to a portable storage medium in the form of an IC card 11 which the driver carries with him while traveling on the toll road.

Figure 5:
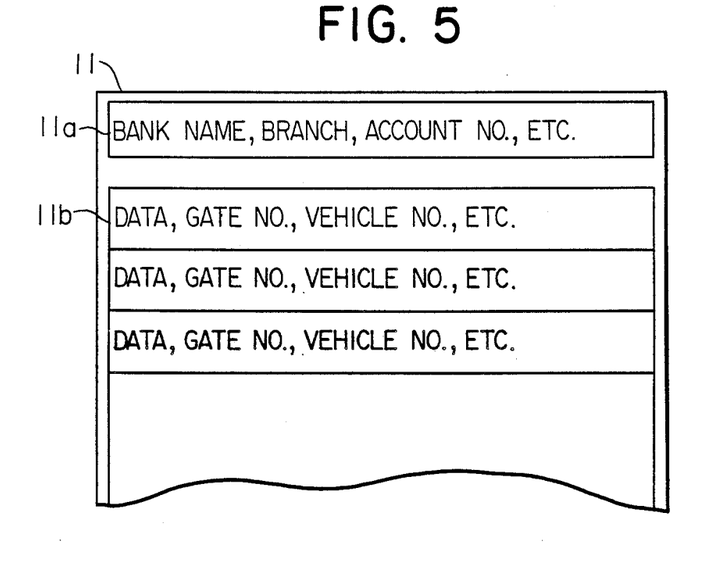
FIG. 5 is a memory map of the IC card of FIGS. 1 and 2.

FIG. 5 is a memory map of the IC card 11. It comprises two types of electronic memories. One is an unalterable memory 11a which contains information necessary for collecting tolls from the driver, such as the driver's name, the name of his bank, and the number of the account from which he wishes tolls to be withdrawn. This information is stored in the unalterable memory 11a in advance. The other memory is an alterable memory 11b which is used to record information which may vary each time the driver uses the toll road. The alterable memory 11b is initially blank. The IC card 11 need not have any particular shape, and for ease of use, it is conceivable for it to be in the form of a driver's license with the memories 11a and 11b embedded therein.

The first read and write mechanism 12 is electrically connected to the decoder 7. The characters on the license plate of the vehicle 2 which are recognized by the decoder 7 and various information which are necessary for toll collection, such as the gate number of the entrance toll gate which the vehicle 2 entered is sent from the decoder 7 to the first read and write mechanism 12, and the first read and write mechanism 12 writes this information into the alterable memory 11b of the IC card 11. When the writing of the information is completed, the IC card 11 is ejected from the first read and write mechanism 12.

A rear obstacle 13 which is similar in structure to the front obstacle 5 is disposed to the rear of the first read and write mechanism 12. The rear obstacle 13 is equipped with a plurality of sharp spikes 13a which can be extended from or retracted into unillustrated slits in the surface of the road. The rear obstacle 13 is for the purpose of preventing a vehicle 2 from accidentally or intentionally trying to pass through the entrance toll gate without the driver of the vehicle 2 having inserted his IC card 11 into the first read and write mechanism 12 or before the process of reading and writing the necessary information into the IC card 11 has been completed. The rear obstacle 13 is controlled by the sequence controller 4 in conjunction with the first read and write mechanism 12. The spikes 13a of the rear obstacle 13 are maintained in an extended state until the first read and write mechanism 12 has finished writing information into the IC card 11, and when the writing operation has been completed, the sequence controller 4 makes the rear obstacle 13 retract the spikes 13a, and the vehicle 2 is allowed to enter the toll road.

An exit-side vehicle detector 14 which detects when the vehicle 2 leaves the entrance-side toll gate is disposed in a suitable location to the rear of the rear obstacle 13, such as atop a frame built over the road. The exit-side vehicle detector 14 has the same construction as the entrance-side vehicle detector 1. It is electrically connected to the sequence controller 4, and when the exit-side vehicle detector 14 sends an output signal to the sequence controller 4 indicating that the vehicle 2 has left the entrance toll gate, the sequence controller 4 restores each portion of the entrance toll gate to its initial state in preparation for the next vehicle 2.

All the members constituting the entrance toll gate are covered by a protective cover 15.

Figure 2:
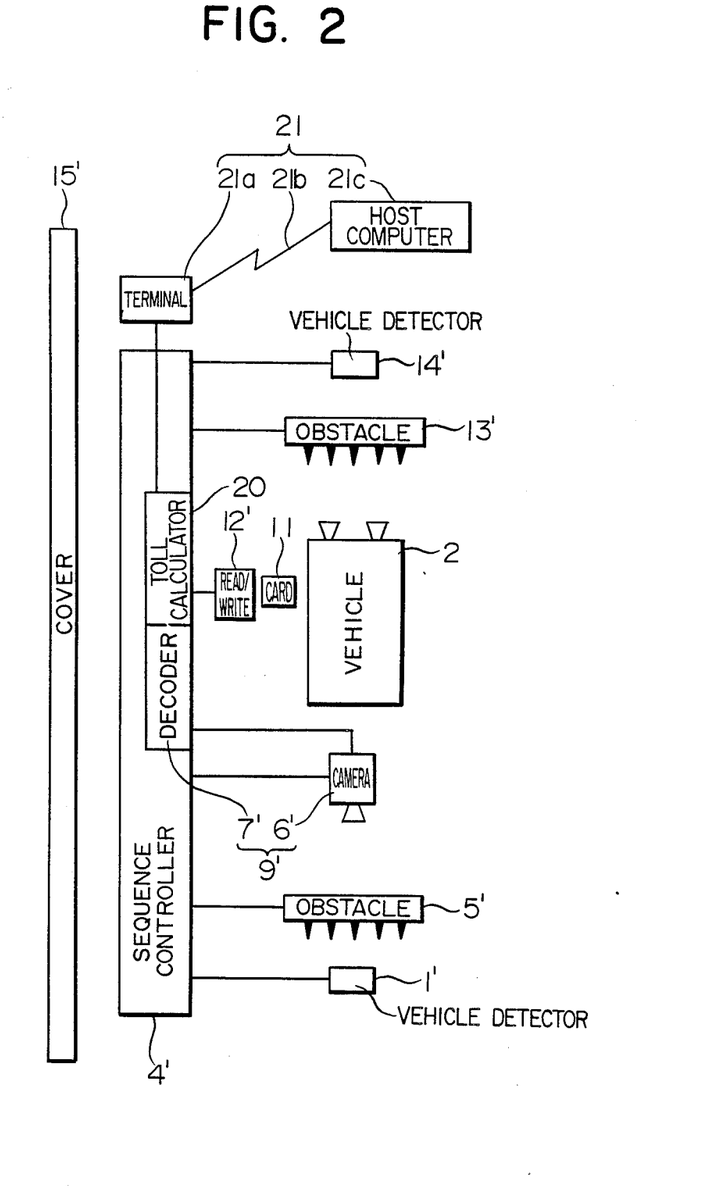
FIG. 2 is a schematic plan view of the portion of the embodiment of FIG. 1 which is installed at an exit toll gate of the toll road.

FIG. 2 is a schematic plan view of the portion of this embodiment which is installed on an exit toll gate at an exit to the toll road. Those parts which are marked with an apostrophe (') are identical in structure to parts in FIG. 1 having the same reference numeral, and an explanation thereof will be omitted. The portion of this embodiment at the exit toll gate is equipped with a comparing and toll calculating mechanism 20 which is electrically connected to a decoder 7' and a second read and write mechanism 12'. Like the decoder 7 of FIG. 1, the decoder 7' recognizes characters written on the license plate of the vehicle 2 and then provides this information to the comparing and toll calculating mechanism 20. A second information transfer means in the form of a second read and write mechanism 12' reads information from the two memories 11a and 11b of the memory card 11 and provides this information to the comparing and toll calculating mechanism 20. From the data provided to it by the second read and write mechanism 12', the comparing and toll calculating mechanism 20 selects that data which corresponds to the data provided to it by the decoder 7', i.e., it selects data which corresponds to the vehicle 2 which is presently at the exit toll gate. Based on the data which it selected, it calculates the toll from the entrance toll gate where the vehicle 2 entered the toll road up to the present exit toll gate. The comparing and toll calculating mechanism 20 is electrically connected to a toll withdrawal mechanism 21 comprising an on-line terminal 21a, a host computer 21c in a remote location such as a bank, and a transmission line 21b which connects the terminal 21a with the host computer 21c. The host computer 21c performs banking operations and automatically withdraws the toll from the bank account which is indicated by the data in the unalterable memory 11a of the IC card 11.

A plurality of entrance toll gates having the structure illustrated in FIG. 1 are disposed at the entrances to the toll road, and a plurality of exit toll gates having the structure illustrated in FIG. 2 are disposed at the exits from the toll road.

The operation of the illustrated embodiment is as follows. First, the operation at the entrance toll gate of FIG. 1 will be described. When there is no vehicle 2 at the entrance toll gate, the spikes 5a of the front obstacle 5 and the spikes 13a of the rear obstacle 13 initially protrude above the road so as to prevent the passage of a vehicle. When a vehicle 2 then enters the entrance toll gate, the light rays which are shined at the road surface by the light-emitting element of the entrance-side vehicle detector 1 are blocked by the vehicle 2, as a result of which the amount of light which is received by the light-receiving element changes, and the entrance-side vehicle detector 1 provides an electrical signal to the sequence controller 4 indicating the presence of a vehicle 2. The sequence controller 4 then outputs a signal to the front obstacle 5 to make it retract its spikes 5a below the surface of the road. It also outputs a start command signal to the video camera 6 to make it begin to perform imaging, and another start command signal to the decoder 7 to make it perform decoding. In response, the video camera 6 forms an image of the license plate of the vehicle 2, and a video signal is sent by the camera 6 to the decoder 7. In the decoder 7, noise and other unwanted signals are removed from the video signal, light and shade are emphasized, and the information written on the license plate, i.e., the license plate number, the vehicle type, and the like are recognized. Image processing methods using a video camera in this manner are already well known. For example, the Japanese National Police Agency employs such a method to catch speeders on highways throughout Japan. In order to increase the processing speed of the image processor, special LSI's which are referred to as digital signal processors or image processors have been developed and are commercially available.

Figure 3:
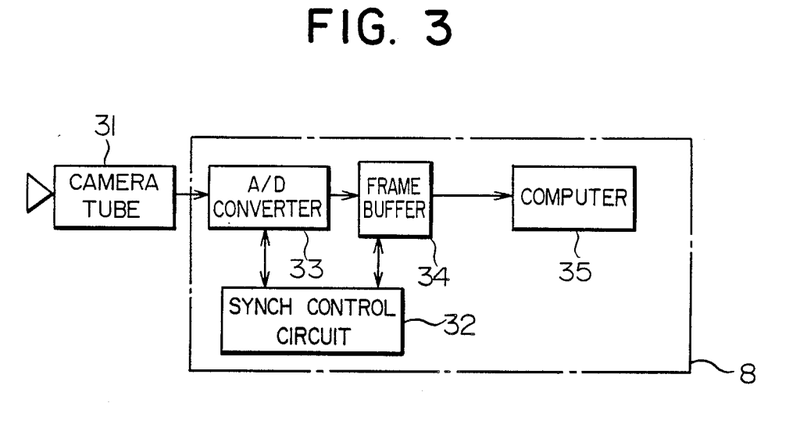
FIG. 3 is a block diagram of the image processor of the embodiment of FIGS. 1 and 2.
Figure 4:
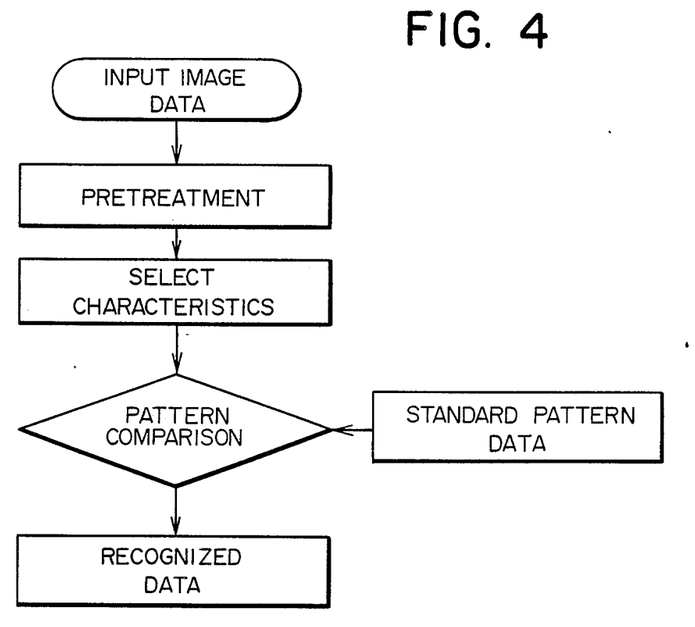
FIG. 4 is a flow chart of the processes performed by the computer of FIG. 3.

FIG. 3 is a block diagram of a typical example of an image processor 8 for use in the present invention. The image which is formed on the target of the camera tube 31 of the video camera 6 is successively scanned from one end of the target to the other by scanning lines which are controlled by a synchronous control circuit 32. The video signal is digitalized at extremely short, constant intervals by an A/D converter 33, and the digital values are stored in a frame buffer 34 as a series of digital values. The video information which is stored in the frame buffer 34 is processed by a computer 35 such as a personal computer. FIG. 4 is a flow chart of the processing steps performed by the computer 35. As shown in FIG. 4, pretreatment is performed in which noise and other unwanted signals are removed from the video information signal which is input to the computer 35 from the frame buffer 34. That portion of the video information signal corresponding to the license plate is then selected based on the characteristics of the flat portions. The selected data is then compared with a standard pattern which was previously stored in the computer 35, and the information which is written on the license plate, such as the license plate number and the vehicle type, is recognized.

In order for the vehicle 2 to be allowed to pass through the entrance toll gate, the driver of the vehicle 2 must first insert his IC card 11 into the first read and write mechanism 12; when a vehicle 2 is at the toll gate, the spikes 13a of the rear obstacle 13 remain up until the IC card 11 has been ejected from the first read and write mechanism 12. The first read and write mechanism 12 reads the data which is stored in the unalterable memory 11a of the IC card 11 and stores it in its own memory. A unique transaction number, such as the bank account number of the owner of the IC card 11, which was read from the unalterable memory 11a, is written by the first read and write mechanism 12 in the alterable memory 11b along with other necessary information such as the gate number of the entrance toll gate, the date and time when the vehicle 2 entered the entrance toll gate, and the information which was recognized by the decoder 7 such as the license plate number and the vehicle type. After this information is written into the memory card 11, the memory card 11 is ejected from the first read and write mechanism 12 and the driver of the vehicle 2 takes the IC card 11 into his possession. At this time, a signal which indicates the ejection of the IC card 11 is sent from the first read and write mechanism 12 to the sequence controller 4, and in response, the sequence controller 4 controls the rear obstacle 13 so as to retract the spikes 13a below the surface of the road, thereby allowing the vehicle 2 to proceed and enter the toll road. The exit-side vehicle detector 14 sends an output signal to the sequence controller 4 when the vehicle 2 leaves the entrance toll gate, so that the sequence controller 4 again makes the spikes 13a of the rear obstacle 13 protrude from the road surface, and the entire apparatus is returned to its initial state in preparation for the entry of the next vehicle.

Next, the operation of the portion of this embodiment at the exit toll gate will be described. A vehicle 2 which is attempting to exit from the toll road is detected by the entrance-side vehicle detector 1' as it enters the exit toll gate in the same manner as at the entrance toll gate, and as a result, the spikes 5a of the front obstacle 5 which protrude above the surface of the road are retracted into corresponding slits. The video camera 6' forms an image of the license plate of the vehicle 2, and the information written on the license plate is decoded and recognized by the decoder 7'. When the vehicle 2 reaches the proximity of the second read and write mechanism 12', the driver inserts his IC card 11 into it. The second read and write mechanism 12' reads the data necessary for toll collection which is recorded in the alterable memory 11b and transmits it to the comparing and toll calculating mechanism 20. From this data, the comparing and toll calculating mechanism 20 selects a data set containing a license plate number which matches the license plate number which was just decoded by the decoder 7', and which furthermore does not contain an indication that the toll has been paid already. Based on the data set which it selects, the comparing and toll calculating mechanism 20 computes the toll from the entrance toll gate indicated by the data to the present toll gate. The date, a processing serial number, the license plate number of the vehicle, the gate number of the exit toll gate, the toll, an indication that the toll has been paid, and other appropriate information are recorded in the alterable memory 11b of the IC card as a new set of data, which becomes the newest data set. After this data is recorded, the IC card 11 is ejected from the second read and write mechanism 12', and the driver removes the IC card 11 therefrom and take the IC card 11 with him. When the IC card 11 is ejected from the second read and write mechanism 12', the sequence controller 4' makes the rear obstacle 13' retract its spikes 13' and the vehicle 2 can exit from the toll road. After the exit-side vehicle detector 14' detects that the vehicle 2 has left the exit toll gate, the sequence controller 4' restores each portion of the exit toll gate to its initial state.

In order to collect the toll, the comparing and toll calculating mechanism 20 transmits the data necessary for toll collection to an on-line terminal 21a which is connected through a transmission line 21b to the host computer 21c of a specified bank at which the owner of the IC card 11 maintains an account. The on-line terminal 21 calls the host computer 21c over the transmission line 21b, and an amount corresponding to the toll is withdrawn from the account of the person having the bank account number indicated in the unalterable memory 11a of the IC card. This amount is then automatically transferred to a specified bank account of the operator of the toll road.

In order to prevent persons from tampering with the data in the unalterable memory 11a of the IC card 11 and in order to prevent the loss of this data, the unalterable memory 11a can be designed so that data can be written into it only one time, and a lock mechanism can be provided which makes the IC card 11 unusable if an attempt is made to alter the data in the unalterable memory 11a.

In anticipation of problems in the future concerning the payment of tolls, such as persons claiming that they did not use the toll road on a certain date, it is desirable that the video cameras 6 and 6' form images not only of the license plate of the vehicle 2 but of other portions of the vehicle 2 as well, such as the passenger compartment, and that these images be stored on video tape or other suitable storage medium. Then, if problems concerning the payment of tolls later occur, the video image of the car and the driver can be reproduced and the problem can be settled.

Figure 6:
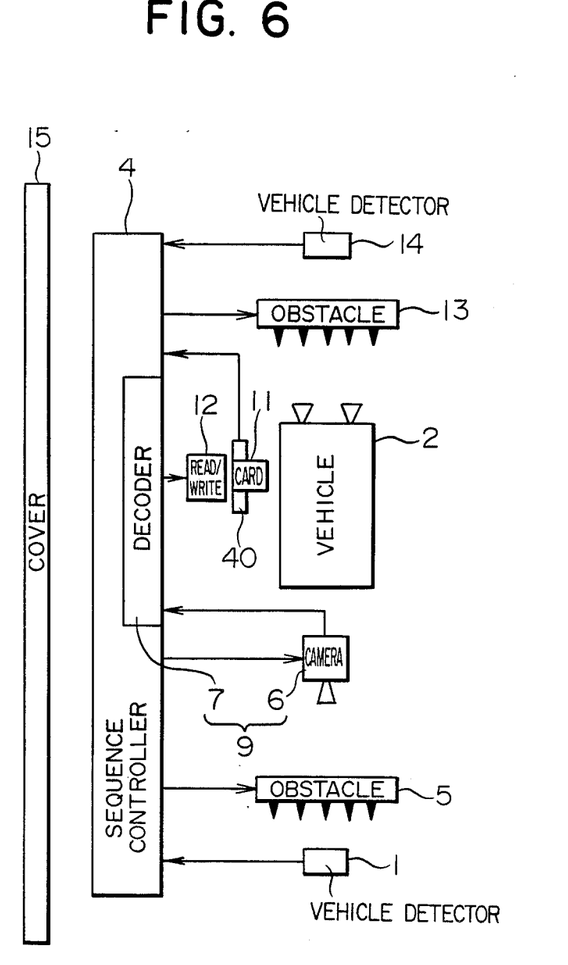
FIG. 6 is a schematic plan view of the portion of a second embodiment of a toll collector which is installed at an entrance toll gate.

FIG. 6 is a schematic plan view of a portion of another embodiment of the present invention. The illustrated portion is the portion installed on an entrance toll gate of the toll road. This embodiment differs from that illustrated in FIG. 1 in that it further comprises a card removal sensor 40 which senses when the IC card 11 has been removed from the first read and write mechanism 12 by the driver of the vehicle 2. It comprises a photoelectric circuit equipped with a light-emitting element and a light-receiving element, and it is disposed in the vicinity of the first read and write mechanism 12 so that when the IC card 11 is ejected from the first read and write mechanism 12 after the completion of reading and writing, the IC card 11 will block the pathway of light between the light-emitting element and the light-receiving element when the driver removes the IC card 11 from the first read and write mechanism 12. When the light rays from the light-emitting element are blocked, the detector 40 outputs an electrical signal to the sequence controller 4. In response, the sequence controller 4 controls the rear obstacle 13 so as to lower the spikes 13a below the surface of the road and permit the vehicle 2 to advance. The structure and operation of this embodiment are otherwise the same as that of the embodiment of FIG. 1. The provision of the card removal detector 40 ensures that the driver of the vehicle 2 will not leave the toll gate until he has taken the IC card 11 with him. A similar card removal detector 40 can also be installed at the exit toll gate with the same effects.

In the above-described embodiment, the storage medium which is used for storing information necessary for the collection of tolls is in the form of an IC card which the driver of the vehicle carries on his person. However, it is not limited to an IC card. For example, it can be a storage medium which is built into the vehicle and which the driver removes from the vehicle and inserts into the read and write mechanism 12 or 12' each time he comes to an entrance or exit toll gate.

From the above description, it can be seen that a toll collector in accordance with the present invention can collect highway tolls totally automatically without any cash transactions being performed. Therefore, it is not necessary to station human attendants at the toll gates, it is not necessary to count cash receipts, and it is not necessary to collect cash from the toll gates at the end of the day, so a great savings in labor costs can be achieved.

Furthermore, due to automation of the toll collection process, each vehicle can pass through a toll gate more rapidly than with a conventional collection process, so traffic backups at toll gates can be alleviated.

In addition, since the license plate number of a vehicle is recorded on the IC card when the vehicle enters the toll road, if a driver exchanges his IC card with another driver while on the highway in order to attempt to pay a lesser toll, when either of the drivers attempts to exit from the toll road, as the license plate number recorded on his vehicle, the operator of the toll road can immediately detect the attempted fraud and can apprehend the driver of the vehicle. Therefore, illegal use of the toll road in this manner can be completely prevented.

An automatic toll collector in accordance with the present invention can be installed at existing toll gates one unit at a time, and it can make use of existing on-line computer networks for banking without major changes in software or building of new central computing equipment, so its installation can be accomplished economically and without disrupting an existing toll collecting system. In addition, an existing toll gate can be easily equipped with the toll collector of the present invention in a short length of time, so the down-time of the toll gate during conversion is significant.

What is claimed is:

1. An automatic toll collector for collecting tolls on a toll road comprising:
   first decoding means disposed at an entrance toll gate of a toll road for recognizing the information contained in a distinctive marking on a vehicle entering said entrance toll gate, said distinctive marking uniquely identifying said vehicle;
   a portable storage medium for storing information which identifies a bank account, said portable storage medium being transported along said toll road by said vehicle;
   first information transfer means disposed at said entrance toll gate and responsive to said first decoding means for reading information which is stored in said portable storage medium and writing into said portable storage medium information for calculating tolls and information contained in said distinctive marking on said vehicle;
   second decoding means disposed at an exit toll gate of said toll road for recognizing the information contained in said distinctive marking of said vehicle when said vehicle enters said exit toll gate;
   second information transfer means disposed at said exit toll gate for reading the information which was written into said portable storage medium by said first information transfer means;
   comparing and toll calculating means responsive to said second decoding means and said second information transfer means for selecting from the data which was read by said second information transfer means data which contains information which matches the information which was recognized by said second decoding means and for calculating the toll from said entrance toll gate to said exit toll gate based on the selected data; and
   toll withdrawal means for automatically withdrawing the calculated toll from said bank account which is identified by the information in said portable storage medium.

2. A toll collector as claimed in claim 1, wherein said vehicle is equipped with a license plate having characters marked thereon, and said distinctive marking comprises said characters on said license plate.

3. A toll collector as claimed in claim 1, wherein said portable storage medium is an IC card.

4. A toll collector as claimed in claim 3, wherein said IC card contains an unalterable memory containing information identifying said bank account and an alterable memory which can be written into by said first and second information transfer means.

5. A toll collector as claimed in claim 1, wherein said first and second decoding means each comprise a video camera which is disposed so as to form an image of said distinctive marking and image processing means for processing said image of said distinctive marking and recognizing the information contained therein.

6. A toll collector as claimed in claim 1, further comprising at each of said toll gates:
   an exit-side obstacle having an open position in which it allows a vehicle to leave the toll gate and a closed position in which it prevents a vehicle from leaving the toll gate;
   completion detecting means for detecting when said information transfer means at the toll gate has completed the transfer of information with respect to the storage medium; and
   obstacle control means responsive to said information transfer means and said completion detecting means at the toll gate for controlling the exit-side obstacle at the toll gate so as to move from its closed position to its open position only after the information transfer means at the toll gate has completed transferring information with respect to said portable storage medium.

7. A toll collector as claimed in claim 6, further comprising at each of said toll gates:
   exit-side vehicle detecting means for detecting when a vehicle has left the toll gate; and
   control means responsive to the exit-side vehicle detecting means for controlling the exit-side obstacle so as to move from its open position to its closed position when the exit-side vehicle detecting means detects that a vehicle has left the toll gate.

8. A toll collector as claimed in claim 6, wherein:
   said portable storage medium comprises an object which is inserted into each of said information transfer means in order to be read from or written upon;
   said completion detecting means comprises removal detecting means for detecting whether said portable storage medium has been removed from the information transfer means at the toll gate; and
   said obstacle control means comprises means responsive to the removal detecting means for controlling the exit-side obstacle at the toll gate as to move from its closed position to its open position only after the removal detecting means has detected that said portable storage medium has been removed from the information transfer means at the toll gate.

9. A toll collector as claimed in claim 1, wherein said toll withdrawal means comprises:
   host computer means for withdrawing funds from a bank account in a bank; and
   terminal means responsive to said comparing and toll calculating means for indicating to said host computer means the bank account identified by the information in said storage medium and the amount of the toll which was calculated by said comparing and toll calculating means.

10. An apparatus for collecting tolls on a toll road comprising:

first decoding means disposed at an entrance toll gate of a toll road for recognizing the information contained in a distinctive marking on a vehicle entering the entrance toll gate, the distinctive marking uniquely identifying the vehicle;

a portable storage medium which is transported along the toll road by the vehicle;

first information transfer means disposed at the entrance toll gate and responsive to the first decoding means for writing into the portable storage medium a data set including information for calculating tolls and information contained in the distinctive marking on the vehicle;

second decoding means disposed at an exit toll gate of the toll road for recognizing the information contained in the distinctive marking of the vehicle when the vehicle enters the exit toll gate;

second information transfer means disposed at the exit toll gate for reading information from the portable storage medium;

comparing and toll calculating means responsive to the second decoding means and the second information transfer means for selecting from the information which was read by the second information transfer means a data set which contains information which matches the information which was recognized by the second decoding means and for calculating the toll from the entrance toll gate to the exit toll gate based on the selected data set.

11. An automatic toll collector for collecting tolls on a toll road comprising:

a first decoder at an entrance toll gate of a toll road for forming an image of a license plate of a vehicle entering the entrance toll gate and recognizing the license plate number;

a portable data storage device which is transported along the toll road by the vehicle and which stores a bank account number;

a first information transfer device disposed at the entrance toll gate and responsive to the first decoder for writing into the portable memory device a data set including information for calculating tolls and the license plate number of the vehicle;

a second decoder disposed at an exit toll gate of the toll road for forming an image of a license plate of the vehicle when the vehicle enters the exit toll gate and recognizing the license plate number;

a second information transfer device disposed at the exit toll gate for reading information from the portable data storage device;

comparing and toll calculating means responsive to the second decoder and the second information transfer device for selecting from the information which was read by the second information transfer device a data set which contains the license plate number which was recognized by the second decoder and for claculating the toll from the entrance toll gate to the exit toll gate based on the selected data set; and toll withdrawal means for automatically withdrawing the calculated toll from the bank account stored in the portable memory device.

* * * * *